United States Patent [19]
Lloyd

[11] Patent Number: 5,806,236
[45] Date of Patent: Sep. 15, 1998

[54] TANGLE FREE, TRI-FOLD, FISHING-LURE PACKET

[76] Inventor: Mancelle R. Lloyd, 6111 Briarview Ct., Alexander, Va. 22310

[21] Appl. No.: 902,913

[22] Filed: Jul. 30, 1997

[51] Int. Cl.$^6$ .................................................. A01K 97/06
[52] U.S. Cl. ................................................................ 43/57.1
[58] Field of Search .................................... 43/54.1, 57.1; 206/315.11, 783

[56] References Cited

U.S. PATENT DOCUMENTS

| | | | |
|---|---|---|---|
| 891,055 | 6/1908 | Frost | 43/57.1 |
| 915,557 | 3/1909 | Cooper | 43/57.1 |
| 2,625,261 | 1/1953 | Swift . | |
| 3,940,873 | 3/1976 | Lawless | 43/57.5 |
| 4,467,551 | 8/1984 | Pulver | 43/54.1 |
| 4,703,581 | 11/1987 | Whittier | 43/57.1 |
| 4,970,821 | 11/1990 | Young | 43/54.1 |
| 5,020,269 | 6/1991 | Gentry et al. | 43/54.1 |

*Primary Examiner*—Robert P. Swiatek
*Attorney, Agent, or Firm*—Thomas Zack

[57] ABSTRACT

A compact foldable fishing lure packet having a flexible backing with two folds, three formed backing sections and two lure overlapping flaps in two of the sections. Separate engaging hook and loops or hook and pile strips extend across the width of the two flapped sections and are used to retain the eye or unhooked end of a lure inserted between them. Such lures may be easily inserted and removed from the strips for use. For each inserted lure the hooked end rests against a section back and is maintained in place laterally by the overlapping section flap which bears against it. The other backing section may have a transparent window and pocket to hold a fishing license or the like. Hook and loop pad fasteners are used on the back of the upper and the front of the lower section to hold the folded unit together when in transport. When folded the lure pac will fit snugly within a user's pocket, fishing vest or creel.

6 Claims, 1 Drawing Sheet

TANGLE FREE, TRI-FOLD, FISHING-LURE PACKET

BACKGROUND OF THE INVENTION

Fishing lures, such as spin flies or wet/dry flies, have been transported in various types of containers or packets. When compactness is desired folding packets were used to insure the assembly could be conveniently stored on the user's person. Critical to such foldable lure storage packets is the requirement that the end hooks not become tangled with each other. Should the hook ends become tangled it is not only time consuming and annoying to attempt to separate them from each other but there is always the possibility that the sharp lure barbed hook ends may end up piercing the fingers of the fisherman in the untangling operation. Anyone who has ever had such a hook become lodged in their finger knows the difficulty of taking it out. Lure packet designers have either ignored the tangle problem or have sought to overcome this potential hook tangle problem by placing the lures in separate individual pockets or enclosure within the container. Each has its clear drawbacks as ignoring the problem insures it will take place and using a separate individual internal storage pocket for each lure may result in a larger total packet volume than can be conveniently carried by a user in their shirt pocket, fishing vest or creel. The present invention seeks to overcome both of these drawbacks by addressing the tangle problem and yet providing a compact foldable lure packet in which individual lure hook ends do not become entangled with each other as further described herein.

DESCRIPTION OF THE PRIOR ART

Storage packets for fishing lures are known. For example, in U.S. Pat. No. 2,625,261 to Swift, a fisherman's fly book is disclosed wherein a series of staggered overlapping pockets with each containing an envelope with a possible fly therein. One pocket within the book can be used to hold a license card. The Lawless invention (U.S. Pat. No. 3,940,873) describes a shield for fish hooks wherein hook and loop pads within a hinged body engage the barbed hook end of an individual hook to shield it and restrain its movement. The fishing lure storage apparatus disclosed in the Pulver patent (U.S. Pat. No. 4,467,551), has a plurality of compartments that may be folded over on each other and maintained in that position by a releasable fastener. An external hook and loop mounting means may be used to attach the folded compartments to a tackle box or other surface. The Young invention (U.S. Pat. No. 4,970,821) discloses a fishing tackle wrapper having envelopes in multiple rows with hook or loop closures for each envelope. A strip containing hooks or loops along the back of each envelope can be used to secure the folded envelopes together as a unit. And in the Gentry et al. reference (U.S. Pat. No. 5,020,269) the fishing bait organizer describes a plurality of self-sealing lure containing bags with loop fasteners used to attach the bags to a backing member. The present invention differs from this cited and the known prior art by providing for a foldable lure container wherein each lure is releasably held at its non hooked end by hook and loop strips while a transparent plastic flap covering engages the remainder of the lure as more further set forth in this specification.

This invention relates to a foldable lure packet or container wherein each lure is releasably held at its non hooked (eye) end between a hook and loop strip while a flexible plastic covering engages the remainder of the lure within one of the packets folded areas.

It is the primary object of the present invention to provide for an improved fishing lure foldable packet wherein the lures' hooked ends will not become tangled with each other.

Another object is to provide for the easy insertion and/or removable of fishing lures from the packet and, when its folded state, the snug fitting of the packet into a user's shirt pocket, fishing vest or creel.

Another object is to provide for such a packet capable of conveniently storing many fishing lures and a fishing license while the lures are secured and remain tangle free.

These and other objects and advantages of the present invention will become apparent to readers from a consideration of the ensuing description and the accompanying drawings.

DESCRIPTION OF THE PREFERRED EMBODIMENT

Figure 1:
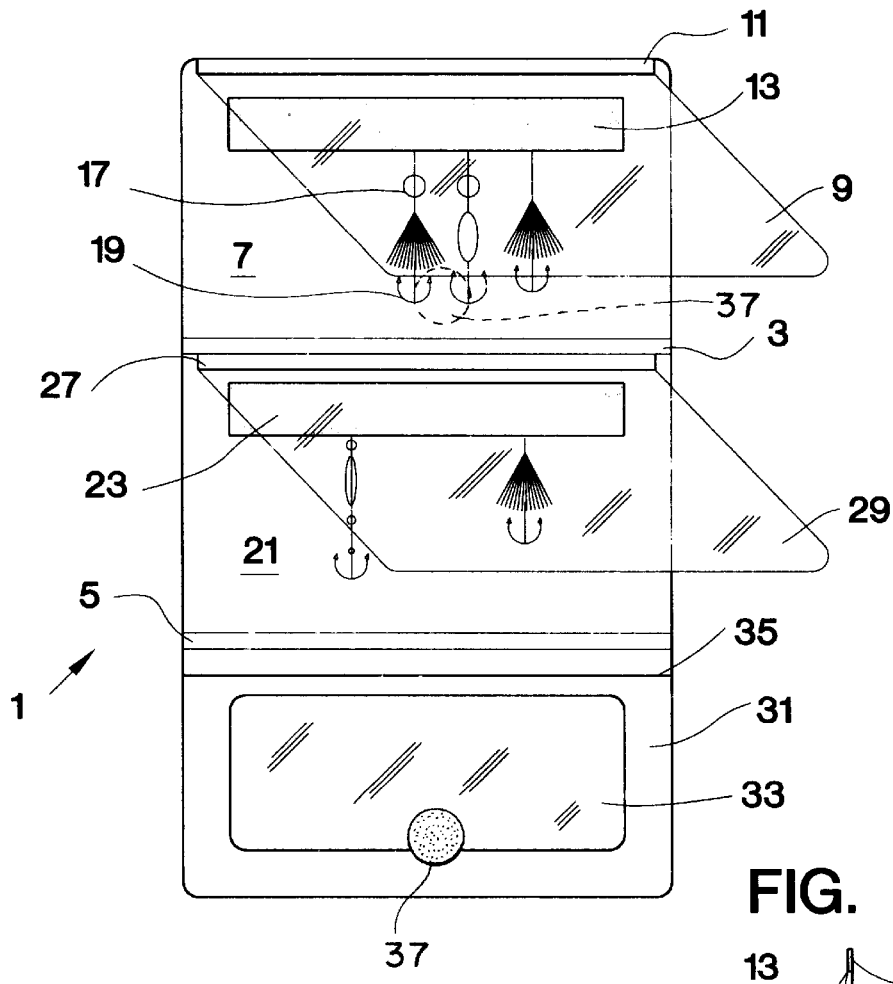
FIG. 1 is a front view of the invention's preferred embodiment with its two plastic flaps opened.

FIG. 1 is a front view of the invention's preferred embodiment with its two plastic flaps opened. The backing member 1 is made of a vinyl, leather or canvas material and has two distinct separate folds 3 and 5 extending across its width. This permits the backing to be folded twice upon itself to form a compact wallet like structure which can be conveniently carried by a user. The upper backing section 7, above fold 3, has a Mylar or transparent clear plastic flap material 9, attached widthwise to its top portion under the fold over portion 11. This flap extends substantially over the entire surface area of the upper backing section 7. Between the upper portion of the flap 9 and the backing section 7 just below where the flap is attached to it, are separate facing and engaging hoop and loop strips 13 and 15 which overlap each other such that only the frontal strip 13 is visible in this view. Hook and pile strips may also be used for these strips and are intended to be included in the term hook and loop as used herein. Inserted between the two hook and loop strips is the upper non hooked rigid lure end 17 to which the leader is attached. As shown the lures' upper eye ends are spaced along the strip such that their lower hooked ends 19 are physically separated from each other as they bear against the backing section 7.

The lower backing section 21 between the two folds 3 and 5 is substantially the same as the upper section 7. Thus, it has its own hook and loop widthwise engaging separate strips 23 and 25 (not shown) used to hold the non hooked or eye ends of the stored lures, and an upper folded edge 27 used to attach the folded transparent flap 29 to substantially overlap and cover the section 21. Backing section 21 is also the same in surface area and shape as the upper backing section 7 to permit its complete covering by the latter section when folded down on it.

At the backing lowest and smallest area section 31, there is a clear window or pocket 33 attached to the section with an upper opened widthwise top 35. A fishing license or other identification material, etc. may be placed within the formed pocket 33.

Figure 2:
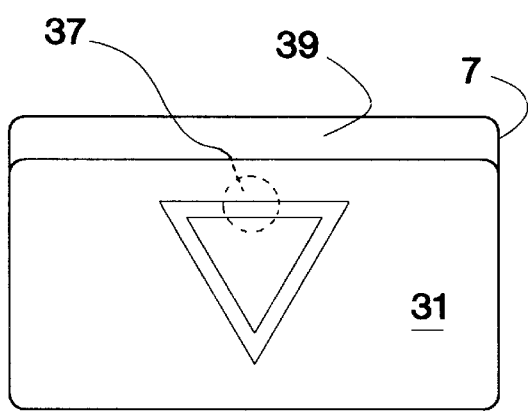
FIG. 2 is a front view of the FIG. 1 packet while in a closed folded position.

FIG. 2 is a front view of the FIG. 1 packet while in a closed folded position. The back sides of lower smaller section 31 are shown overlapping the back side of upper section 7 with the two hook and loop closure members 37 fastened to hold these two back sections together over the middle section 21 (not shown) to form a folded or closed position. One of the two circular shaped pads making up the hook and loop members for closure 37 is located on the face of smaller section 31, near the lower midpoint of and over transparent pocket 33, while the other closure pad member is on the back surface of upper backing section 7. This latter pad is shown in dotted line format. Since the surface area for backing section 31 is less than the surface area for either of the other two backing sections, when folded there is an exposed non-overlapping space 39 on the sections backs which permits the two member hook and loop closure 37 pads to engage each other. When so engaged these pads are shown in FIG. 2 in dotted line format as they are covered by the back of section 31.

Figure 3:
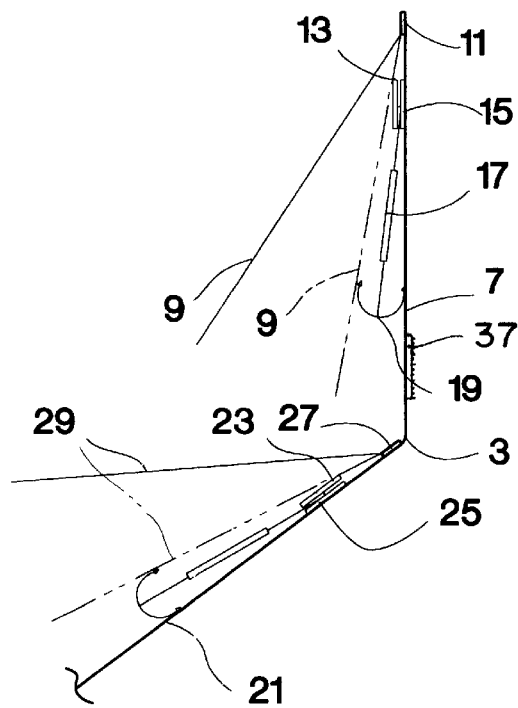
FIG. 3 shows an enlarged side view of a single fishing lure with its non hooked end being releasably held between a hook and loop fastener.

FIG. 3 shows an enlarge side view of a single fishing lure with its non hooked end being releasable held between a hook and loop fastener. Only the upper backing section 7 is completely shown in this view, it being understood that the partially shown middle section 21 would be configured and used in the same manner to hold lures. The lure's rigid eye end located at the upper end of lure member 17 is placed between the separate facing and engaging hook and loop strips 13 and 15. Each lure is spaced from its adjacent lure such that the lower hooked ends 19 do not touch or overlap with each other. When the clear vinyl or Mylar flap 9 bears against the lures held at their upper ends by the strips, the lures are prevented from lateral movement against the backing section 7 and thus unable to have their hooked ends become tangled with each other. In this third figure flap 9 and flap 29 are shown in both their raised positions (solid lines) and their lower positions (dotted lines) relative to the their respective backing sections. In the lower positions the flaps engage the lures' hooked ends. The closure pad 37 on the back of section 7 is also shown in this figure.

Preferably the hook and loop (or hook and pile) fastener strips (13/15 and 23/25) may be made of material provided by the APLIX® company of Charlotte, N.C. and bear its trade name APLIX #800, or if not available, VELCRO™ material can be used for them. Each hook and loop strip (15 and 25) has one of its smooth sides facing the backing sections 7 and 21 and bonded or otherwise attached to the backing section. When closed, a compact wallet-like packet is formed which can carry many different lures and a fishing license. In one embodiment of the invention the opened size for the backing was 6 inches wide by 10 inches long with a folded size of 3.5 inches by 6 inches wide. The lower smaller section 31 was 3 inches in height by 6 inches wide while the other two sections had the same width and were 0.5 inches more in height. For example, in this embodiment more than ten spinner lures or spin flies lures were stored. Or thirty-six or more wet flies lures could have been stored in the same embodiment.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A device for storing fishing lures comprising:

a flexible planar backing member having an upper, middle and lower section with each section having a height and width;

hook and loop strip members attached near the top portions of at least two of said backing sections and extending substantially across the width of each section;

a backing section overlapping flap attached to the upper portions of said at least two backing sections and positioned to substantially cover their backing section surface areas; and fastening means mounted on the surfaces of the upper and lower backing sections to retain said sections in a closed position when folded over each other.

2. The device as claimed in claim 1, wherein said fastener means includes two engageable hook and loop pads attached to the back surface of the upper section backing and the front surface of the lower section.

3. The device as claimed in claim 1, wherein said lower section include a transparent faced pocket adapted to retain a document identifying a user.

4. The apparatus as claimed in claim 3, wherein lower section is smaller in surface area than said upper section to permit an exposed backing area when folded over the upper section.

5. A storage device with a fishing lure comprising in combination:

a flexible planar backing member having an upper, middle and lower section with each section having a height and width;

hook and loop strip members attached near the top portions of at least two of said backing sections and extending substantially across the width of each section;

a backing section overlapping flap attached to the upper portions of said at least two backing sections and positioned to substantially cover their backing section surface area;

fastening means mounted on the surfaces of the upper and lower backing sections to retain said sections in a closed position when folded over each other; and a fishing lure having an eye end and a hooked end, said lure's eye end being insertable between the hook and loop strip members to be held therebetween while the lure's hooked end is adapted to bear against a backing section.

6. The combination as claimed in claim 5, wherein said overlapping section flaps are made of a transparent material and capable of engaging and bearing against the hooked end of the inserted lure.

* * * * *